US012750606B2

(12) United States Patent

Kobayashi et al.

(10) Patent No.: US 12,750,606 B2
(45) Date of Patent: Sep. 29, 2026

(54) PHOTOELECTRIC CONVERSION APPARATUS, SUBSTRATE, AND APPARATUS WITH ANALOG-TO-DIGITAL CONVERSATION CIRCUIT

(71) Applicant: CANON KABUSHIKI KAISHA, Tokyo (JP)

(72) Inventors: Hideo Kobayashi, Tokyo (JP); Yuji Nakajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 18/679,673

(22) Filed: May 31, 2024

(65) Prior Publication Data

US 2024/0414454 A1 Dec. 12, 2024

(30) Foreign Application Priority Data

Jun. 6, 2023 (JP) ................................ 2023-093307

(51) Int. Cl.
*H04N 25/772* (2023.01)
*H04N 25/76* (2023.01)
(Continued)

(52) U.S. Cl.
CPC ......... *H04N 25/772* (2023.01); *H04N 25/771* (2023.01); *H04N 25/7795* (2023.01); *H04N 25/79* (2023.01); *H04N 25/767* (2023.01)

(58) Field of Classification Search
CPC .... H04N 25/772; H04N 25/78; H04N 25/767; H04N 25/7795; H04N 25/771; H04N 25/79
See application file for complete search history.

(56) References Cited

U.S. PATENT DOCUMENTS

| | | | |
|---|---|---|---|
| 7,777,170 B2 * | 8/2010 | Murakami | H03M 1/1023 341/169 |
| 7,990,440 B2 | 8/2011 | Kobayashi | |

(Continued)

FOREIGN PATENT DOCUMENTS

| | | |
|---|---|---|
| JP | 2011-050046 A | 3/2011 |
| JP | 2013-090234 A | 5/2013 |

(Continued)

OTHER PUBLICATIONS

U.S. Appl. No. 18/504,387, filed Nov. 8, 2023, Kobayashi, Hideo; Hasegawa, So.

(Continued)

*Primary Examiner* — Kelly L Jerabek
(74) *Attorney, Agent, or Firm* — Venable LLP

(57) ABSTRACT

A photoelectric conversion apparatus comprises a pixel including a photoelectric conversion element, and configured to output two signals having different amplitudes based on incident light to the photoelectric conversion element, a sampling and holding unit configured to sample and hold each of the two signals output from the pixel, and an oversampling analog-to-digital conversion circuit configured to sequentially perform analog-to-digital conversion of each of the sampled and held signals. A period for performing analog-to-digital conversion of a signal having a smaller amplitude among the two signals is set shorter than a period for performing analog-to-digital conversion of a signal having a larger amplitude among the two signals.

18 Claims, 13 Drawing Sheets

(51) Int. Cl.
*H04N 25/767* (2023.01)
*H04N 25/771* (2023.01)
*H04N 25/79* (2023.01)

(56) References Cited

U.S. PATENT DOCUMENTS

| | | | | |
|---|---|---|---|---|
| 9,407,847 | B2 | 8/2016 | Maehashi | |
| 9,438,828 | B2 * | 9/2016 | Itano | H04N 25/77 |
| 9,509,931 | B2 | 11/2016 | Kobayashi | |
| 9,602,752 | B2 | 3/2017 | Kobayashi | |
| 10,015,430 | B2 | 7/2018 | Kobayashi | |
| 10,609,316 | B2 | 3/2020 | Kobayashi | |
| 11,268,851 | B2 | 3/2022 | Kobayashi | |
| 11,323,648 | B2 | 5/2022 | Matsuura | |
| 11,431,929 | B2 | 8/2022 | Kobayashi | |
| 11,463,644 | B2 | 10/2022 | Soda | |
| 11,470,275 | B2 | 10/2022 | Kobayashi | |
| 11,496,704 | B2 | 11/2022 | Sato | |
| 11,616,925 | B2 | 3/2023 | Kobayashi | |
| 11,653,114 | B2 | 5/2023 | Nakazawa | |
| 11,688,755 | B2 | 6/2023 | Kobayashi | |
| 11,736,813 | B2 | 8/2023 | Kobayashi | |
| 11,800,253 | B2 | 10/2023 | Saito | |
| 11,843,880 | B2 | 12/2023 | Kobayashi | |
| 11,843,893 | B2 | 12/2023 | Kobayashi | |
| 11,910,116 | B2 | 2/2024 | Kobayashi | |
| 12,538,050 | B2 * | 1/2026 | Kobayashi | H04N 25/78 |
| 2011/0019047 | A1 | 1/2011 | Suzuki et al. | |
| 2012/0019697 | A1 | 1/2012 | Suzuki | |
| 2014/0293103 | A1 | 10/2014 | Wakabayashi et al. | |
| 2016/0360130 | A1 | 12/2016 | Wakabayashi et al. | |
| 2017/0339365 | A1 * | 11/2017 | Kobayashi | H04N 25/771 |
| 2020/0260034 | A1 | 8/2020 | Moue et al. | |
| 2021/0274119 | A1 * | 9/2021 | Nakamura | H04N 25/57 |
| 2022/0247943 | A1 * | 8/2022 | Zhan | H04N 23/74 |
| 2022/0303484 | A1 | 9/2022 | Kobayashi | |
| 2022/0303486 | A1 | 9/2022 | Kobayashi | |
| 2023/0041974 | A1 | 2/2023 | Kobayashi | |
| 2023/0070568 | A1 | 3/2023 | Kobayashi | |
| 2023/0072715 | A1 | 3/2023 | Kobayashi | |
| 2023/0117988 | A1 | 4/2023 | Kobayashi | |
| 2023/0154963 | A1 | 5/2023 | Kobayashi | |
| 2023/0171514 | A1 | 6/2023 | Kobayashi | |
| 2023/0178580 | A1 | 6/2023 | Yamazaki | |
| 2023/0179890 | A1 | 6/2023 | Kobayashi | |
| 2023/0216459 | A1 | 7/2023 | Kobayashi | |
| 2023/0247332 | A1 | 8/2023 | Kobayashi | |
| 2023/0282654 | A1 | 9/2023 | Kobayashi | |
| 2024/0022838 | A1 | 1/2024 | Muto | |
| 2024/0064439 | A1 | 2/2024 | Kobayashi | |
| 2024/0080590 | A1 | 3/2024 | Shimada | |
| 2024/0080591 | A1 | 3/2024 | Takahashi | |
| 2024/0147096 | A1 | 5/2024 | Kobayashi | |
| 2024/0214704 | A1 | 6/2024 | Kobayashi | |
| 2024/0284076 | A1 | 8/2024 | Kobayashi | |

FOREIGN PATENT DOCUMENTS

| | | | |
|---|---|---|---|
| JP | 2019-057873 | A | 4/2019 |
| WO | 2019/069614 | A1 | 4/2019 |

OTHER PUBLICATIONS

U.S. Appl. No. 18/646,985, filed Apr. 26, 2024, Kobayashi, Hideo; Suzuki, Takanori; Nakajima, Yuji.

U.S. Appl. No. 18/673,482, filed May 24, 2024, Kobayashi, Hideo; Sato, Masaki.

U.S. Appl. No. 18/820,408, filed Aug. 30, 2024, Kobayashi, Hideo.

* cited by examiner

PHOTOELECTRIC CONVERSION APPARATUS, SUBSTRATE, AND APPARATUS WITH ANALOG-TO-DIGITAL CONVERSATION CIRCUIT

BACKGROUND OF THE INVENTION

Field of the Invention

The present invention relates to a photoelectric conversion apparatus, a substrate, and an apparatus.

Description of the Related Art

There is a solid-state imaging device including a delta-sigma (ΔΣ) analog-to-digital conversion circuit. International Publication No. 2019/069614 discloses a solid-state imaging device capable of supporting a wide input voltage range by providing two capacitors, each of which stores a signal from a pixel, and outputting the weighted average of the voltages stored in two capacitors.

In some cases, signals having different voltages are read out from one pixel, and each signal undergoes analog-to-digital conversion and is output. Due to readout and conversion of different signals, the length of time required for the readout and conversion poses sometimes a problem.

SUMMARY OF THE INVENTION

One disclosed embodiment has been made in consideration of the above-described problem, and provides a technique advantageous in shortening the time required for readout and analog-to-digital conversion of signals from a pixel.

According to one aspect of the disclosure, there is provided a photoelectric conversion apparatus comprising: a pixel including a photoelectric conversion element, and configured to output two signals having different amplitudes based on incident light to the photoelectric conversion element; a sampling and holding unit configured to sample and hold each of the two signals output from the pixel; and an oversampling analog-to-digital conversion circuit configured to sequentially perform analog-to-digital conversion of each of the sampled and held signals, wherein a period for performing analog-to-digital conversion of a signal having a smaller amplitude among the two signals is set shorter than a period for performing analog-to-digital conversion of a signal having a larger amplitude among the two signals.

Further features of the present invention will become apparent from the following description of exemplary embodiments with reference to the attached drawings.

DESCRIPTION OF THE EMBODIMENTS

Figure 1:
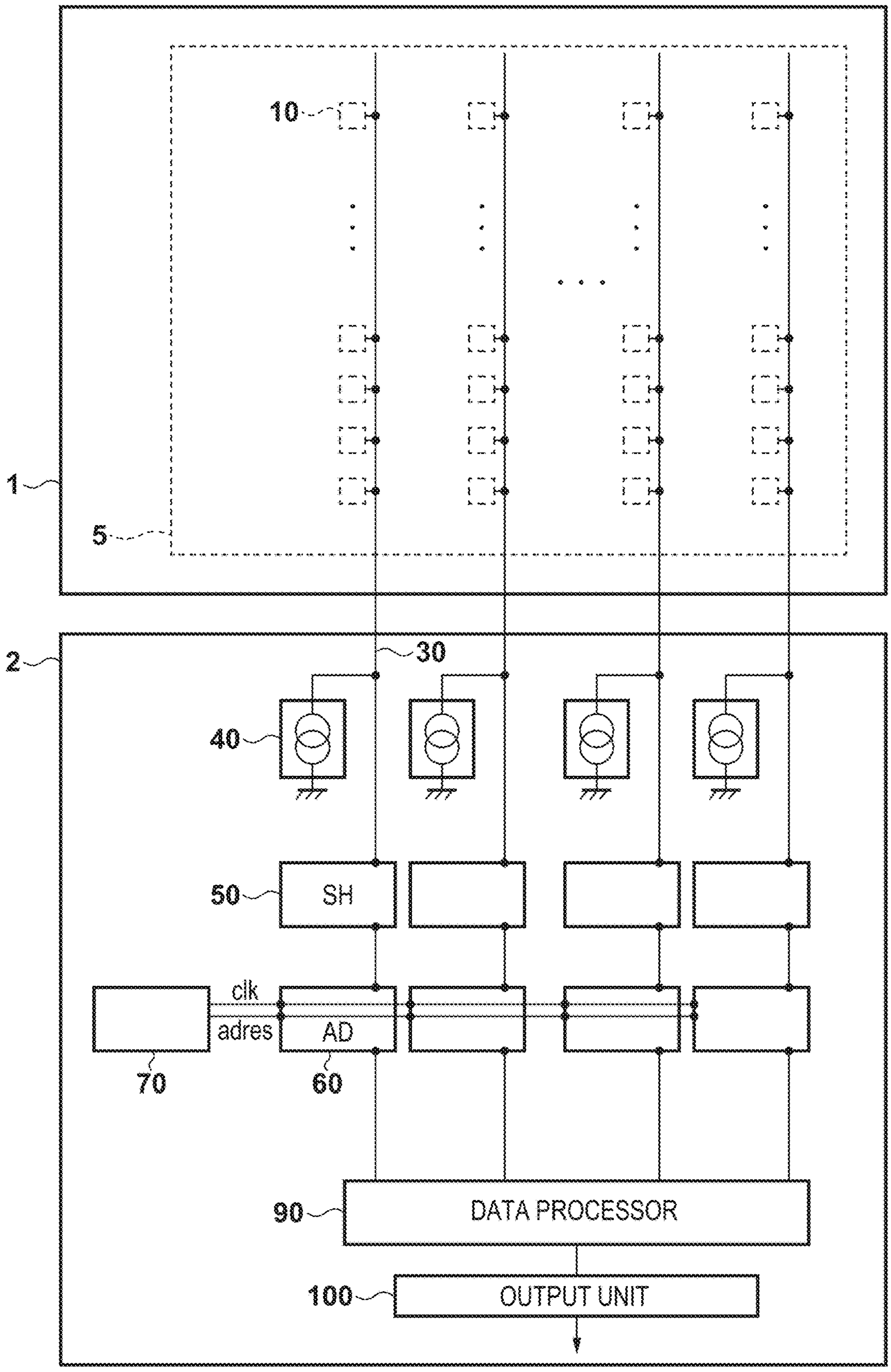
FIG. 1 is a schematic view of a photoelectric conversion apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In this specification, an “amplitude” is sometimes used as an expression indicating the magnitude of a signal. The amplitude indicates the differential voltage between a reference signal and a signal to be described.

First Embodiment

FIG. 1 is a schematic view of a photoelectric conversion apparatus according to this embodiment. The photoelectric conversion apparatus includes a pixel substrate 1, and a circuit substrate 2 mounted with circuits. A pixel region 5 is arranged on the pixel substrate 1. In the pixel region 5, a plurality of pixels 10 each including a photoelectric conversion element which generates signal charges corresponding to incident light are arranged in a matrix. Outputs from the plurality of pixels are output to the circuit substrate 2 via vertical signal lines 30. The pixel substrate 1 and the circuit substrate 2 may be formed on the same substrate, or the circuit substrate 2 may be stacked on the pixel substrate 1. Note that a column direction here indicates the vertical direction in FIG. 1, and indicates the vertical direction in which the vertical signal line 30 extends from the pixel substrate 1 to the circuit substrate 2. A row direction indicates the horizontal direction in FIG. 1, which is orthogonal to the vertical signal line 30.

In the circuit substrate 2, current sources 40, sampling and holding units 50, converters 60, a controller 70, a data processor 90, and an output unit 100 are arranged. The current source 40 is arranged in correspondence with each vertical signal line 30. The current source 40 supplies, via the vertical signal line 30, a bias current to the pixel 10 selected to read out a signal. The vertical signal line 30 transfers a signal corresponding to signal charges generated by the photoelectric conversion element of the pixel 10 from the pixel 10 to the sampling and holding unit 50.

The sampling and holding unit 50 samples and holds the signal generated by the photoelectric conversion element of each pixel 10 from the pixel region 5 via the vertical signal line 30. In this embodiment, the sampling and holding unit 50 includes two sampling and holding circuits. The first sampling and holding circuit samples and holds a signal which corresponds to the reset level upon resetting the photoelectric conversion element. The second sampling and holding circuit samples and holds a signal which corresponds to an image signal obtained when a photoelectric conversion operation is performed in the photoelectric conversion element. Each of the first sampling and holding circuit and the second sampling and holding circuit is provided to each vertical signal line 30.

The converter 60 includes an analog-to-digital conversion circuit that performs analog-to-digital conversion of the signal output from the sampling and holding unit 50. The converter 60 is provided in correspondence with each vertical signal line 30. Here, as the analog-to-digital conversion circuit, a slope analog-to-digital conversion circuit, a successive approximation type analog-to-digital conversion circuit, a delta-sigma (42) analog-to-digital conversion circuit, or the like is used, but the analog-to-digital conversion circuit is not limited thereto. An oversampling analog-to-digital conversion circuit is preferably used.

The controller 70 supplies, to the converter 60, a control signal Adres and a clock signal Clk, which will be described later. The data processor 90 processes a digital signal output from the converter 60. The data processor 90 can perform digital processing such as correction processing or interpolation processing on the digital signal output from the converter 60. The output unit 100 externally outputs the signal processed by the data processor 90.

Figure 2:
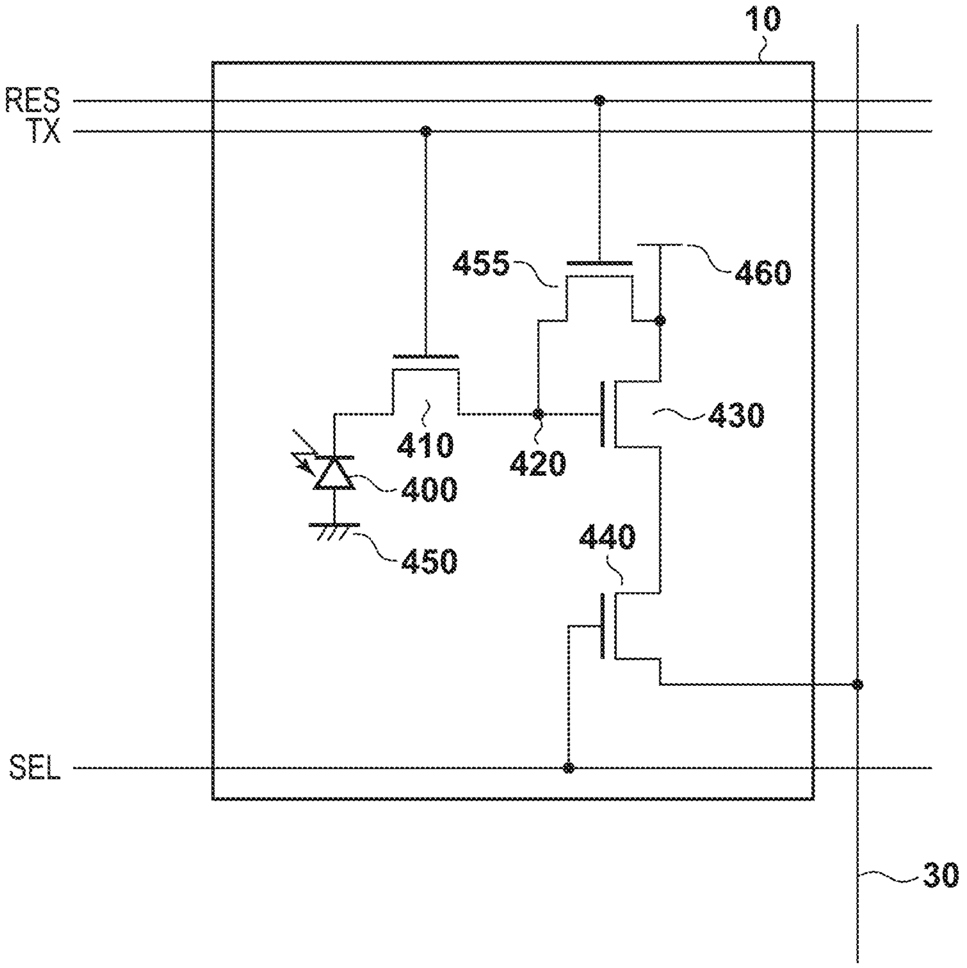
FIG. 2 is a schematic view showing an example of a pixel.

FIG. 2 is a circuit diagram showing an example of the arrangement of the pixel 10. The pixel 10 includes a photoelectric conversion element 400, a transfer transistor 410, a reset transistor 455, an amplification transistor 430, and a selection transistor 440. The photoelectric conversion element 400 is, for example, a photodiode. One of the main electrodes of the photoelectric conversion element 400 is connected to a ground potential 450. The photoelectric conversion element 400 photoelectrically converts incident light into signal charges (for example, photoelectrons) of the charge amount corresponding to the amount of the incident light, and accumulates the signal charges.

The other of the main electrodes of the photoelectric conversion element 400 is electrically connected to the gate electrode of the amplification transistor 430 via the transfer transistor 410. A node 420, to which the gate electrode of the amplification transistor 430 is electrically connected, functions as a floating diffusion. The floating diffusion can operate as a charge-voltage converter that converts the signal charges generated by the photoelectric conversion element 400 into a signal voltage.

A transfer signal TX is supplied to the gate electrode of the transfer transistor 410. When the transfer transistor 410 is set in a conductive state in accordance with the transfer signal TX, the signal charges accumulated in the photoelectric conversion element 400 are transferred to the node 420 serving as the floating diffusion.

The reset transistor 455 is connected between a power supply potential 460 and the node 420. Note that the expression that "a transistor is connected between A and B" represents a state in which one of the main electrodes (source and drain) of the transistor is connected to A and the other of the main electrodes is connected to B. The gate electrode of the transistor is connected to neither A nor B.

A reset signal RES is supplied to the gate electrode of the reset transistor 455. When the reset transistor 455 is set in a conductive state in accordance with the reset signal RES, the potential of the node 420 serving as the floating diffusion is reset to the power supply potential 460, and the charges held by the floating diffusion are swept out. The pixel is reset by this reset operation.

The gate electrode of the amplification transistor 430 is connected to the node 420, one of the main electrodes thereof is connected to the power supply potential 460, and the other of the main electrodes thereof is connected to the selection transistor 440. The gate electrode of the amplification transistor 430 serves as the input section of a source follower circuit that reads out the signal obtained from the photoelectric conversion by the photoelectric conversion element 400. The other of the main electrodes of the amplification transistor 430 is connected to the vertical signal line 30 via the selection transistor 440. The amplification transistor 430 and the current source 40 connected to the vertical signal line 30 form a source follower that converts the voltage of the node 420 into the potential of the vertical signal line 30.

The selection transistor 440 is connected between the amplification transistor 430 and the vertical signal line 30. A selection signal SEL is supplied to the gate electrode of the selection transistor 440. When the selection transistor 440 is set in a conductive state in accordance with the selection signal SEL, the pixel 10 is set in a selected state. In the selected state, the signal is output from the pixel 10 to the vertical signal line 30 via the amplification transistor 430.

The circuit arrangement of the pixel 10 is not limited to the arrangement shown in FIG. 2. For example, the selection transistor 440 may be connected between the power supply potential 460 and the amplification transistor 430. The arrangement shown in FIG. 2 shows, as the pixel 10, a so-called four-transistor arrangement which includes the transfer transistor 410, the reset transistor 455, the amplification transistor 430, and the selection transistor 440. However, the pixel 10 is not limited to this. For example, the pixel 10 may have a three-transistor arrangement in which the selection transistor 440 is omitted and the amplification transistor 430 also functions as the selection transistor. Alternatively, an arrangement with an increased number of transistors such as an arrangement including five transistors or more may be used.

In the pixel 10, when the control signal RES is applied, the potential of the node 420 is reset by the reset transistor 455. When the pixel is reset, a signal at the reset level corresponding to the reset level upon resetting the photoelectric conversion element 400 can be output from the pixel 10. In addition, after the photoelectric conversion element 400 photoelectrically converts incident light, a data signal that can correspond to an image signal, which is generated by performing photoelectric conversion in accordance with the incident light to the photoelectric conversion element 400, can be output from the pixel.

Figure 3:
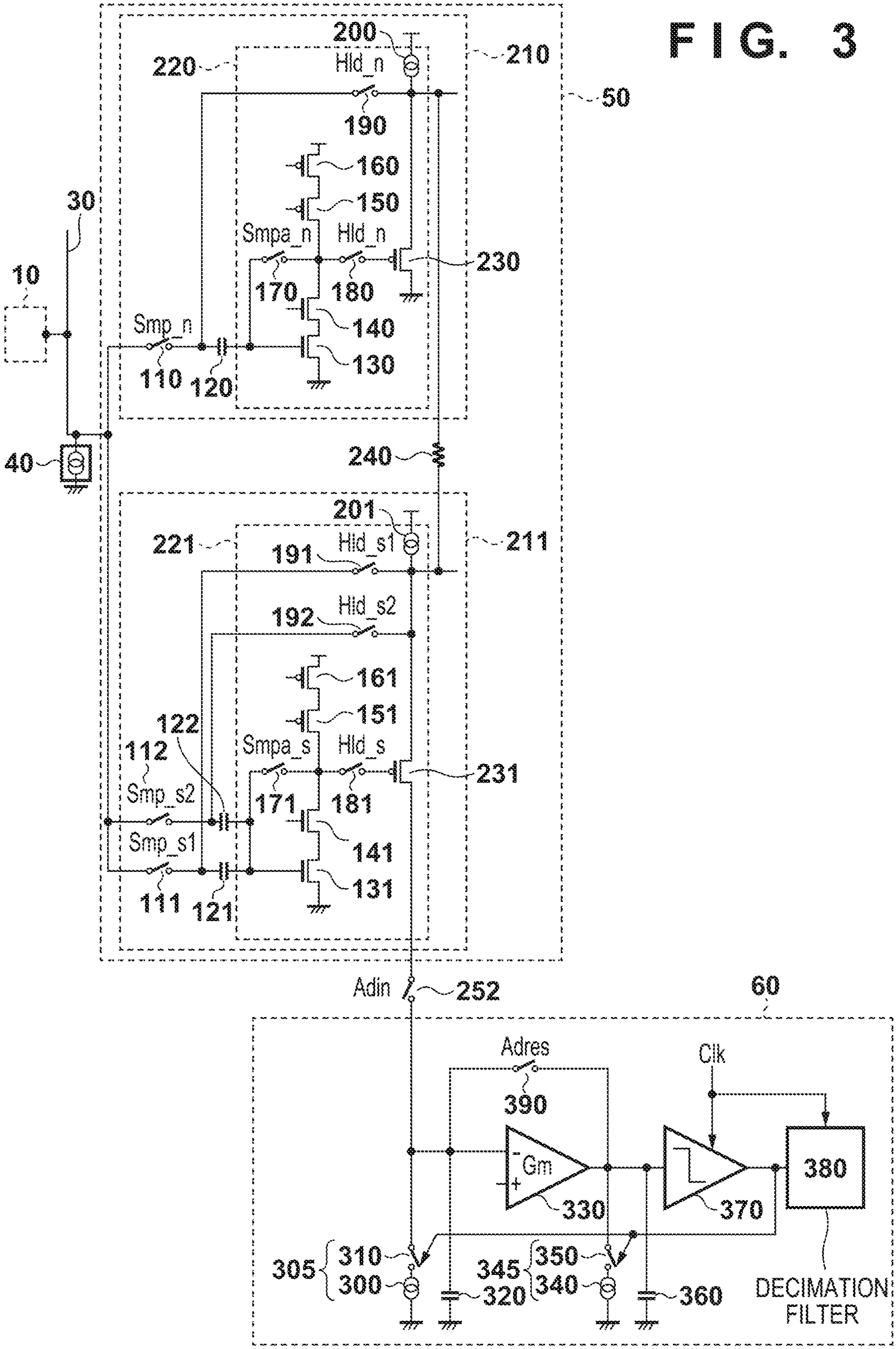
FIG. 3 is a schematic view of the photoelectric conversion apparatus according to the first embodiment.

FIG. 3 is a view showing an example of the circuit configuration concerning the sampling and holding unit 50 and the converter 60. FIG. 3 shows the sampling and holding unit 50 and the converter 60 arranged in correspondence with the vertical signal line 30. In this embodiment, one sampling and holding unit 50 is arranged with respect to one vertical signal line 30.

The sampling and holding unit 50 includes a first sampling and holding circuit 210 and a second sampling and holding circuit 211. As will be described later, the first sampling and holding circuit 210 samples and holds the signal at the reset level output from the pixel when the photoelectric conversion element 400 is reset. The second sampling and holding circuit 211 samples and holds a data signal generated in accordance with incident light to the photoelectric conversion element. The output of the sampling and holding unit 50 is input to the converter 60 via a switch 252. The switch 252 is controlled to be turned on/off by a signal Adin.

The first sampling and holding circuit 210 includes a capacitor 120 and an inverting amplifier 220. A switch 110 controls the connection between the vertical signal line 30 and the capacitor 120 in accordance with a control signal Smp_n. The inverting amplifier 220 can be formed by a combination of a common source amplifier circuit and a source follower circuit. The inverting amplifier 220 includes transistors 130, 140, 150, 160, and 230, switches 170, 180, and 190, and a current source 200. The switch 170 is connected between the input and output of the common source amplifier circuit formed by the transistors 130, 140, 150, and 160, and controlled by a control signal Smpa_n. The signal from the inverting amplifier 220 can be output in accordance with a control signal Hld_n.

The second sampling and holding circuit 211 can have almost the same arrangement as the first signal sampling and holding circuit 210, but is different from the first sampling and holding circuit 210 mainly in that switches 112 and 192 and a capacitor 122 are added. The second sampling and holding circuit 211 includes capacitors 121 and 122, each of which holds the signal from the vertical signal line 30, and an inverting amplifier 221. A switch 111 and the switch 112 control the connection between the vertical signal line 30 and the capacitors 121 and 122 in accordance with control signals Smp_s1 and Smp_s2, respectively.

Similar to the inverting amplifier 220, the inverting amplifier 221 can be formed by a combination of a common source amplifier circuit and a source follower circuit. The inverting amplifier 221 includes transistors 131, 141, 151, 161, and 231, switches 171, 181, and 191, the switch 192, and a current source 201. The switch 171 is connected between the input and output of the common source amplifier circuit formed by the transistors 131, 141, 151, and 161, and controlled by a control signal Smpa_s. The signal from the inverting amplifier 221 is output in accordance with a control signal Hld_s1 or Hld_s2.

A resistor 240 is arranged between the output terminal of the first sampling and holding circuit 210 and the output terminal of the second sampling and holding circuit 211. Consider a case where the first sampling and holding circuit 210 outputs a signal at the reset level, and the second sampling and holding circuit 211 outputs a data signal. Let Vn be the potential at the output terminal of the first sampling and holding circuit 210, that is, the potential of the signal at the reset level, and Vs be the potential at the output terminal of the second sampling and holding circuit 211, that is, the potential of the data signal. Let R be the resistance value of the resistor 240. Accordingly, a current I flowing through the resistor 240 is expressed as:

$$I=(Vn-Vs)/R \tag{1}$$

The current I is input to the converter 60. At this time, the current I flowing through the resistor 240 is proportional to the difference between the potential Vn of the signal at the reset level of the pixel signal and the potential Vs of the data signal. Hence, correlated double sampling (CDS) is performed at the stage in which the current I is input to the converter 60.

The current corresponding to the differential voltage between the output terminal of the first sampling and holding circuit 210 and the output terminal of the second sampling and holding circuit 211 is input to the converter 60 via the switch 252 controlled by the signal Adin.

The converter 60 includes an oversampling analog-to-digital conversion circuit, for example, a ΔΣ analog-to-digital conversion circuit. The ΔΣ analog-to-digital conversion circuit includes a first integrator, a second integrator, a quantizer 370, and a decimation filter 380. In the converter 60, the first integrator is formed by an integral capacitor 320. The second integrator is formed by a voltage-current conversion circuit (Gm cell) 330, which converts a voltage into a current, and an integral capacitor 360. A digital-to-analog converter 305 including a current source 300 and a switch 310 is connected the input node of the first integrator.

In accordance with a digital signal via the second integrator and the quantizer 370, the digital-to-analog converter 305 controls the current to the first integrator. A digital-to-analog converter 345 including a current source 340 and a switch 350 is connected to the input node of the second integrator. The digital-to-analog converter 345 controls the current to the second integrator in accordance with the result obtained by quantizing the output of the second integrator by the quantizer 370. The clock signal Clk is input to the quantizer 370, and the quantization operation is performed in synchronization with the clock signal Clk.

In the converter 60, the quantizer 370 performs an operation of feeding back the preceding quantization value to the second integrator and the first integrator through the digital-to-analog converters 305 and 345. In this manner, by passing the preceding quantization value through the integrators twice while feeding it back to the digital-to-analog converters 305 and 345, a secondary noise shaping characteristic can be obtained. Furthermore, by removing high-frequency noise by the decimation filter 380 arranged at the succeeding stage of the quantizer 370, an accurate analog-to-digital conversion output can be obtained. Note that a switch 390 is connected between the inverting input terminal and output terminal of the Gm cell 330. The switch 390 is controlled by the control signal Adres. By turning on the switch 390, each node of the first integrator and the second integrator can be set in a reset state.

Figure 4:
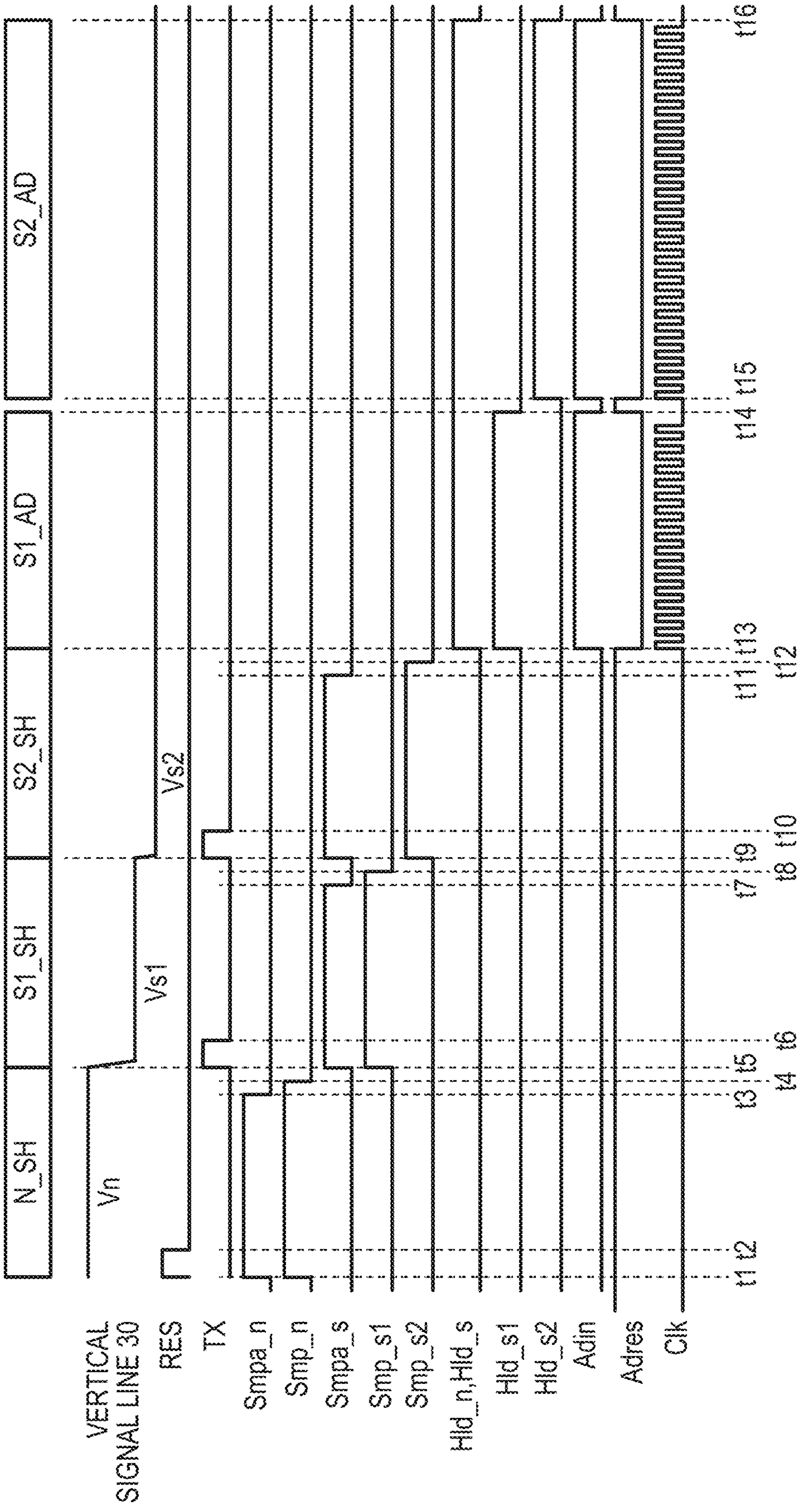
FIG. 4 is a timing chart of the photoelectric conversion apparatus according to the first embodiment.

With reference to FIG. 4 showing operation timings, an operation example of the sampling and holding unit 50 and the converter 60 will be described. The control signal RES is a signal that resets the pixel 10. The transfer signal TX controls readout of the signal from the photoelectric conversion element 400. The control signals Smp_n, Smpa_n, Hld_n, Smp_s1, Smp_s2, Smpa_s, Hld_s1, Hld_s2, and Hld_s control the respective switches of the first sampling and holding circuit 210 and the second sampling and holding circuit 211. A description will be given below assuming that, in each waveform shown in FIG. 4, while the control signal is at high level (for example, the state of the waveform of RES between time t1 and time t2), the corresponding switch is in the ON state (conductive state), and while the control signal is at low level, the corresponding switch is in the OFF state (non-conductive state).

In the period from time t1 to time t2, the control signal RES shown in FIG. 2 is set at high level and the reset transistor 455 is turned on to reset the floating diffusion 420. The control signal SEL shown in FIG. 2 is also controlled to be set at high level. Accordingly, the potential of the vertical signal line 30 is set at the potential Vn of the reset level. In addition, at time t1, the control signals Smp_n and Smpa_n are set at high level, and the switches 110 and 170 of the first sampling and holding circuit 210 are turned on. Then, at time t3 when the control signal Smpa_n transitions from high level to low level, the potential Vn of the reset level is sampled and accumulated in the capacitor 120. Then, at time t4, the control signal Smp_n transitions from high level to low level, the switch 110 is turned off, and the capacitor 120 is disconnected from the vertical signal line 30.

In the period from time t1 to time t4, the control signal Adin is at low level so that the switch 252 is in the OFF state. Thus, the second sampling and holding circuit 211 is not connected to the converter 60. Furthermore, the control signal Adres is at high level so that the switch 390 is in the ON state. Thus, the input and output terminals of the Gm cell 330 is short-circuited, and each node of the first integrator and the second integrator is in the reset state in the converter 60. The clock signal Clk is at low level, and the quantizer 370 is in a state of not performing the quantization operation.

In the period from time t5 to time t6, the control signal TX shown in FIG. 2 is set at high level and the transfer transistor 410 is turned on. During this period, the photo charges generated by the photoelectric conversion element 400 based on the incident light in the period from time t2 to time t6 are transferred from the photoelectric conversion element 400 to the floating diffusion 420. That is, the period from time t2 to time t6 is an exposure period. The potential of the floating diffusion 420 decreases in accordance with the amount of charges. In accordance with the control signal SEL, the potential of the floating diffusion 420 is output to the vertical signal line 30 via the amplification transistor 430.

Accordingly, the potential of the vertical signal line 30 changes to a potential Vs1 of the first data signal. In addition, at time t5, the control signals Smpa_s and Smp_s1 are set at high level, and the switches 111 and 171 are turned on in the second sampling and holding circuit 211 for data signal. Then, at time t7 when the control signal Smpa_s transitions from high level to low level, the switch 171 is turned off, and the potential Vs1 corresponding to the first data signal is sampled and accumulated in the capacitor 121. Then, at time t8, the control signal Smp_s1 transitions from high level to low level, and the switch 111 is turned off to disconnect the capacitor 121 from the vertical signal line 30.

Note that the voltage across the switch 171 upon turning off the switch 171 at time t7 is always approximately the same regardless of the potential of the vertical signal line 30. Therefore, charge injection caused by turning off the switch 171 does not occur, so an error voltage is not generated with respect to the potential Vs1 of the first data signal accumulated in the capacitor 121. Further, when turning off the switch 111 at time t8, both ends of the capacitor 121 are in a high impedance state. Accordingly, there is no influence caused by turning off the switch 111. In this manner, generation of an error voltage with respect to the potential Vs1 of the first data signal can be suppressed.

In the period from time t9 to time t10, the control signal TX shown in FIG. 2 is set at high level again, and the transfer transistor 410 is turned on. During this period, the photo charges generated and accumulated in the photoelectric conversion element 400 based on incident light in the period from time t6 to time t10 are additionally transferred to the floating diffusion 420. That is, in addition to the exposure period from time t2 to time t6, the period from time t6 to time t10 can also serve as the exposure period. The potential of the floating diffusion 420 further decreases in accordance with the amount of the charges. Accordingly, the potential of the vertical signal line 30 decreases to a potential Vs2 corresponding to the second data signal. In addition, at time t9, the control signals Smpa_s and Smp_s2 are set at high level, and the switches 112 and 171 are turned on in the second sampling and holding circuit 211 for data signal.

Then, at time t11 when the control signal Smpa_s transitions from high level to low level, the potential Vs2 of the second data signal is sampled and accumulated in the capacitor 122. Then, at time t12, the control signal Smp_s2 transitions from high level to low level, and the switch 112 is turned off to disconnect the capacitor 122 from the vertical signal line 30.

Note that the voltage across the switch 171 upon turning off the switch 171 at time t11 is always approximately the same regardless of the potential of the vertical signal line 30. Therefore, an error voltage is not generated with respect to the potential Vs2 of the second data signal accumulated in the capacitor 122 by charge injection caused by turning off the switch 171. Further, when turning off the switch 112 at time t12, since both ends of the capacitor 122 are in a high impedance state, there is no influence caused by turning off the switch 112. In tins manner, generation of an error voltage with respect to the potential Vs2 of the second data signal can be suppressed.

At time t13, the control signal Hld_n is set at high level and the switches 180 and 190 are turned on, so that the capacitor 120 outputs the potential Vn of the signal at the reset level in the first sampling and holding circuit 210. Simultaneously, at time t13, the control signals Hld_s1 and Hld_s are also set at high level and the switches 181 and 191 are turned on, so that the capacitor 121 outputs the potential Vs1 of the first data signal in the second sampling and holding circuit 211. Simultaneously, at time t13, the control signal Adin is also set at high level, so that the sampling and holding unit 50 is connected to the converter 60. Furthermore, simultaneously, at time t13, the control signal Adres is set at low level, the switch 390 is turned off, and the reset state of each node of the first integrator and the second integrator is canceled.

As has been described above, the input current to the converter 60 is a current corresponding to the difference between the potential Vn of the signal at the reset level at the output terminal of the first sampling and holding circuit 210 and the potential Vs1 of the first data signal at the output terminal of the second sampling and holding circuit 211. The converter 60 performs analog-to-digital conversion of the current corresponding to the difference between the potential Vn and the potential Vs1.

In the period from time t13 to time t14, a clock operation driven by the clock signal Clk is enabled, and a quantization operation is performed by the quantizer 370 in each clock cycle. As has been described above, by passing the preceding quantization value through the integrators twice while feeding it back to the digital-to-analog converters 305 and 345 in each clock cycle, a secondary noise shaping characteristic can be obtained. Furthermore, by removing high-frequency noise by the decimation filter 380 arranged at the succeeding stage of the quantizer 370, an accurate analog-to-digital conversion output can be obtained.

At time t14, the analog-to-digital conversion of the signal corresponding to the potential Vs1 of the first data signal of the second sampling and holding circuit 211 is completed. Simultaneously, the control signal Adin is set at low level to turn off the switch 252. With this, the sampling and holding unit 50 is disconnected from the converter 60. Furthermore, simultaneously, at time t14, the control signal Adres is set at high level and the switch 390 is turned on, so that each node of the first integrator and the second integrator is reset.

Furthermore, simultaneously, at time t14, the clock operation driven by the clock signal Clk is temporarily stopped.

In the period from time t14 to time t15, the sampling and holding unit 50 is disconnected from the converter 60, the reset state of each node of the first integrator and the second integrator is reset by the control signal Ares, and the state in which the clock operation is stopped is set as indicated by the clock signal Clk. In this manner, the period from time t13 to time t14 where the clock signal is supplied is the analog-to-digital conversion period, and the period from time t14 to time t15 is the analog-to-digital conversion stop period or the analog-to-digital converter reset period.

As has been described above, in the analog-to-digital conversion period, the sampling and holding unit 50 is connected to the converter 60, and a signal current can be input from the sampling and holding unit 50 to the converter 60. In addition, in the analog-to-digital conversion period, the control signal Adres is at low level, and the reset state of each node of the first integrator and the second integrator is canceled. Furthermore, in the analog-to-digital conversion period, the clock operation driven by the clock signal Clk is enabled.

At time t15, the control signal Adin is set at high level, and the sampling and holding unit 50 is connected to the converter 60. In addition, when the control signal Hld_s2 is set at high level and the switch 192 is turned on at time t15, the capacitor 122 outputs the potential Vs2 of the second data signal in the second sampling and holding circuit 211. With this, a current corresponding to the difference between the potential Vn of the signal at the reset level at the output terminal of the first sampling and holding circuit 210 and the potential Vs2 of the second data signal at the output terminal of the second sampling and holding circuit 211 is input to the converter 60. The converter 60 performs analog-to-digital conversion of this current. In the period from time t15 to time t16, the control signal Adres is set at low level, and the clock operation driven by the clock signal Clk is enabled. During this period, as in the case of the first data signal, analog-to-digital conversion of the signal corresponding to the potential Vs2 of the second data signal of the second sampling and holding circuit 211 is performed.

Here, the potential Vs1 of the first data signal and the potential Vs2 of the second data signal are signals corresponding to different accumulation times (exposure times). Therefore, the amplitudes are not the same except for a dark state where exposure is not performed. Since the exposure period (time t2 to time t10) of the second data signal is longer than the exposure period (time t2 to time t6) of the first data signal, unless the amount of incident light to the photoelectric conversion element 400 largely changes, the potential Vs2 has a larger amplitude than the potential Vs1. In this embodiment, the analog-to-digital conversion period of the potential Vs1 of the first data signal is set shorter than the analog-to-digital conversion period of the potential Vs2 of the second data signal. More specifically, in FIG. 4, the period from time t13 to time t14 is set shorter than the period from time t15 to time t16. The amplitude here corresponds to the differential voltage with respect to the reference voltage which is the voltage of the signal output from the pixel 10 when the floating diffusion 420 is reset. Note that, unless otherwise noted, for the amplitude described below as well, the reference voltage can be the voltage of the signal output from the pixel 10 when the floating diffusion 420 is reset.

With this, during the period from time t13 to time t14, the number of clock cycles of the clock signal Clk is decreased, thereby reducing the oversampling rate. The oversampling analog-to-digital conversion circuit can perform analog-to-digital conversion even if the number of cycles is changed and the period required for analog-to-digital conversion is shortened. A possible negative effect of this is that the gradation of analog-to-digital conversion decreases due to an increase in noise. However, decreasing the gradation of analog-to-digital conversion of the signal on the small amplitude side is allowable. Therefore, by shortening the analog-to-digital conversion period of the signal on the small amplitude side, this embodiment can suppress speed reduction of the analog-to-digital conversion while ensuring the accuracy of analog-to-digital conversion of the signal on the large amplitude side.

Note that in FIG. 4, an example of shortening the analog-to-digital conversion period has been described while taking a case of reducing the number of clock cycles as an example, but the present invention is not limited thereto. For example, the number of clock cycles remains the same but the clock frequency may be increased. That is, in the period from time t13 to time t14, the analog-to-digital conversion period may be shortened by making the clock frequency higher than in the period from time t15 to time t16. In this case, it is necessary to cope with a power increase and a dynamic change of the clock frequency, but since the number of clock cycles can be increased, deterioration of the gradation can be suppressed.

Note that the resistor 240 between the output terminal of the first sampling and holding circuit 210 and the output terminal of the second sampling and holding circuit 211 may be a variable resistor. That is, the level to the converter 60 may be adjustable in accordance with the resistance value. The resistance value of the resistor 240 is changed between the period from time t13 to time t14 in which the potential Vs1 of the first data signal is read from the capacitor 121 and the period from time t15 to time t16 in which the potential Vs2 of the second data signal is read from the capacitor 122. By changing the resistance value, noise reduction or power reduction corresponding to the amplitude level can be implemented. This will be described below.

If the resistance value is made relatively smaller in the period from time t13 to time t14 than in the period from time t15 to time t16, the noise of the first data signal can be reduced by reducing the thermal noise generated by the resistor 240. On the other hand, if the resistance value in the period from time t13 to time t14 is made relatively larger than in the period from time t15 to time t16, the output current to the converter 60 can be decreased, thereby implementing power reduction.

In addition, in this embodiment, by sharing the second sampling and holding circuit 211 between the capacitor 121 and the capacitor 122, it is possible to read out the respective potentials Vs1 and Vs2 of two data signals (the first data signal and the second data signal) without increasing the operating power. Further, as has been described above, the error voltage with respect to the respective potentials Vs1 and Vs2 of two data signals can be suppressed, so that degradation of the image quality in HDR image capturing can be suppressed.

Furthermore, since the respective potentials Vs1 and Vs2 of two data signals are read out using the common resistor 240, level fluctuations caused by temperature and process variations are easily synchronized. With this, for example, superimposition of different variations on the respective potentials Vs1 and Vs2 of the data signals can be suppressed, thereby suppressing degradation of the image quality of an HDR image.

Figure 5:
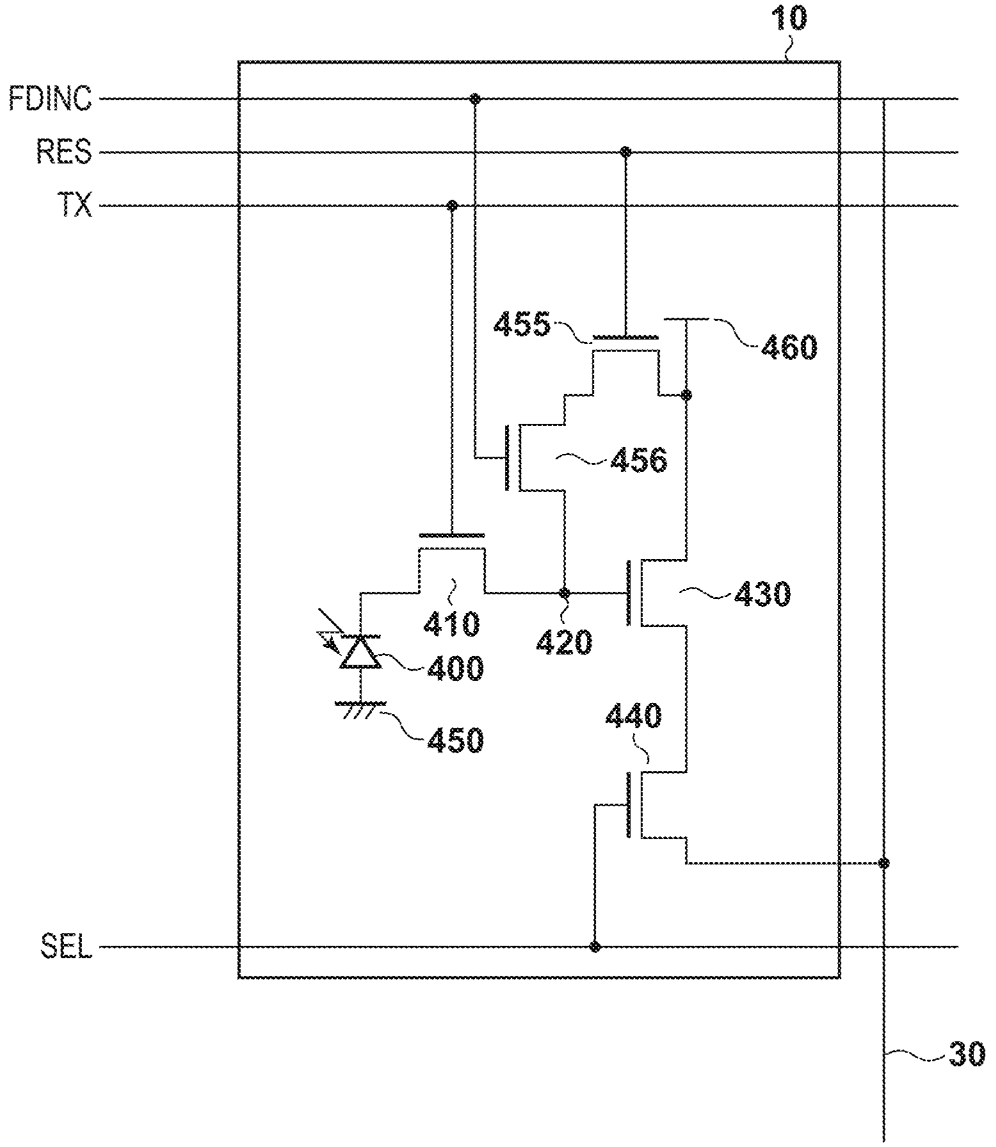
FIG. 5 is a schematic view showing a modification of the pixel according to the first embodiment.

Note that, as shown in FIG. 5, the pixel 10 may include a transistor 456 that switches the capacitance of the floating diffusion 420. By switching ON/OFF of the transistor 456 by a signal FDINC during the readout period, for example, at time t9 in FIG. 4, the capacitance of the floating diffusion 420 is changed. At this time, the transistor 456 functions as a gain changing portion for changing the capacitance of the floating diffusion. Alternatively, another capacitor may be connected to the floating diffusion via a transistor, and the capacitance may be changed by switching ON/OFF of the transistor. With the gain changing portion, signals having different voltage conversion gains can be output to and held by the capacitors 121 and 122, respectively. It becomes possible to perform HDR image capturing while using signals having different voltage gains.

Second Embodiment

Figure 6:
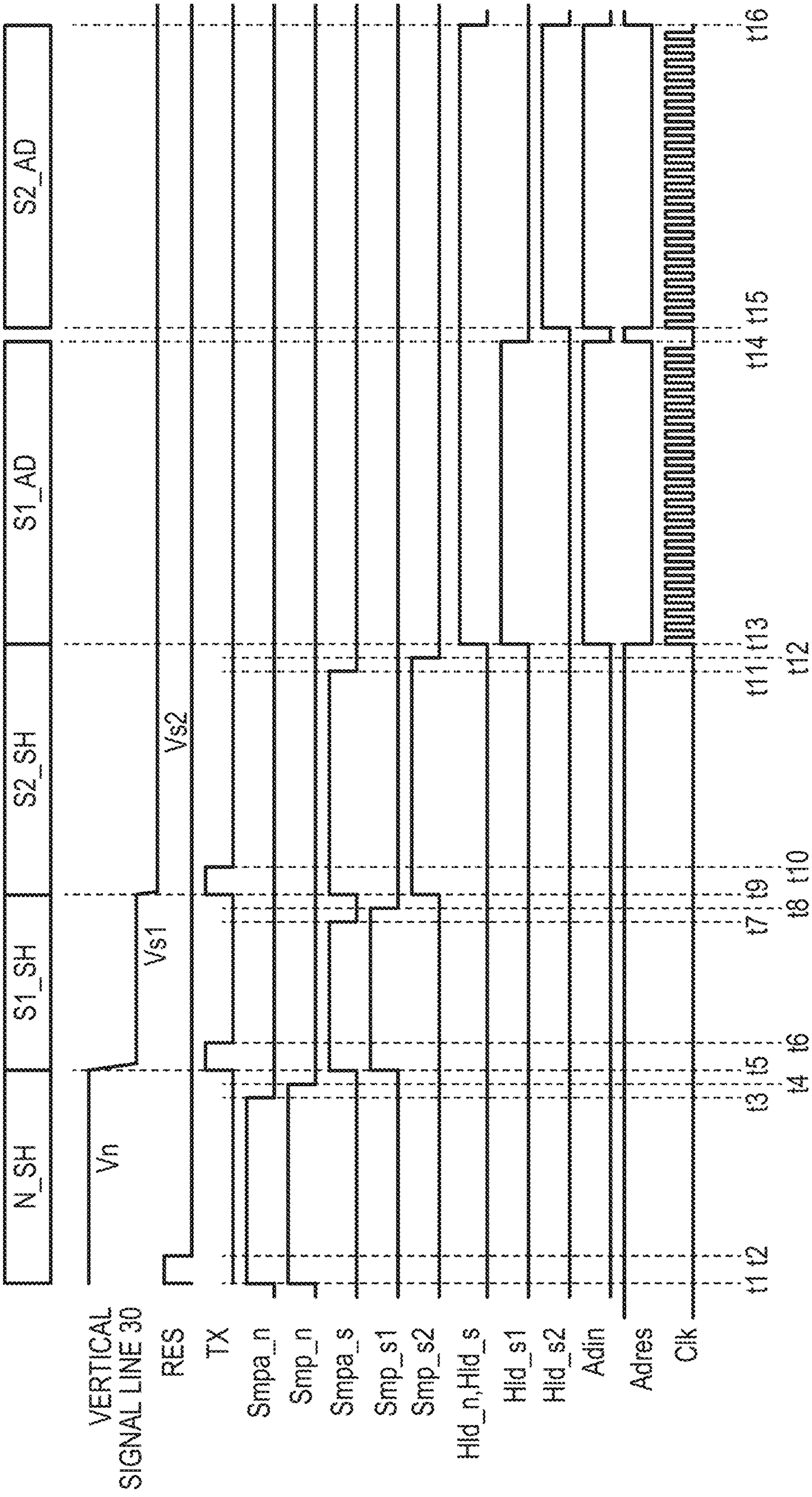
FIG. 6 is a timing chart of a photoelectric conversion apparatus according to the second embodiment.

FIG. 6 shows a timing chart of a photoelectric conversion apparatus according to the second embodiment. Only points different from FIG. 4 of the first embodiment will be described below. In FIG. 6, a sampling period S1_SH for a potential Vs1 of the first data signal from time t4 to time t9 is set shorter than a sampling period S2_SH of a potential Vs2 of the second data signal from time t9 to time t13. The amplitude of the first data signal is smaller than that of the second data signal. A signal having a small amplitude requires a shorter time required for settlement when sampling it by a sampling and holding circuit. By setting the sampling periods as described above, speed reduction can be suppressed while ensuring the accuracy of the signal on the large amplitude side. Further, in combination of this embodiment to the first embodiment, the conversion time of the potential Vs1 of the first data signal can be set shorter than the conversion time of the potential Vs2 of the second data signal. By also changing setting of the time required for conversion, the time required for readout and conversion of signals from the photoelectric conversion element can be further shortened.

Third Embodiment

Figure 7:
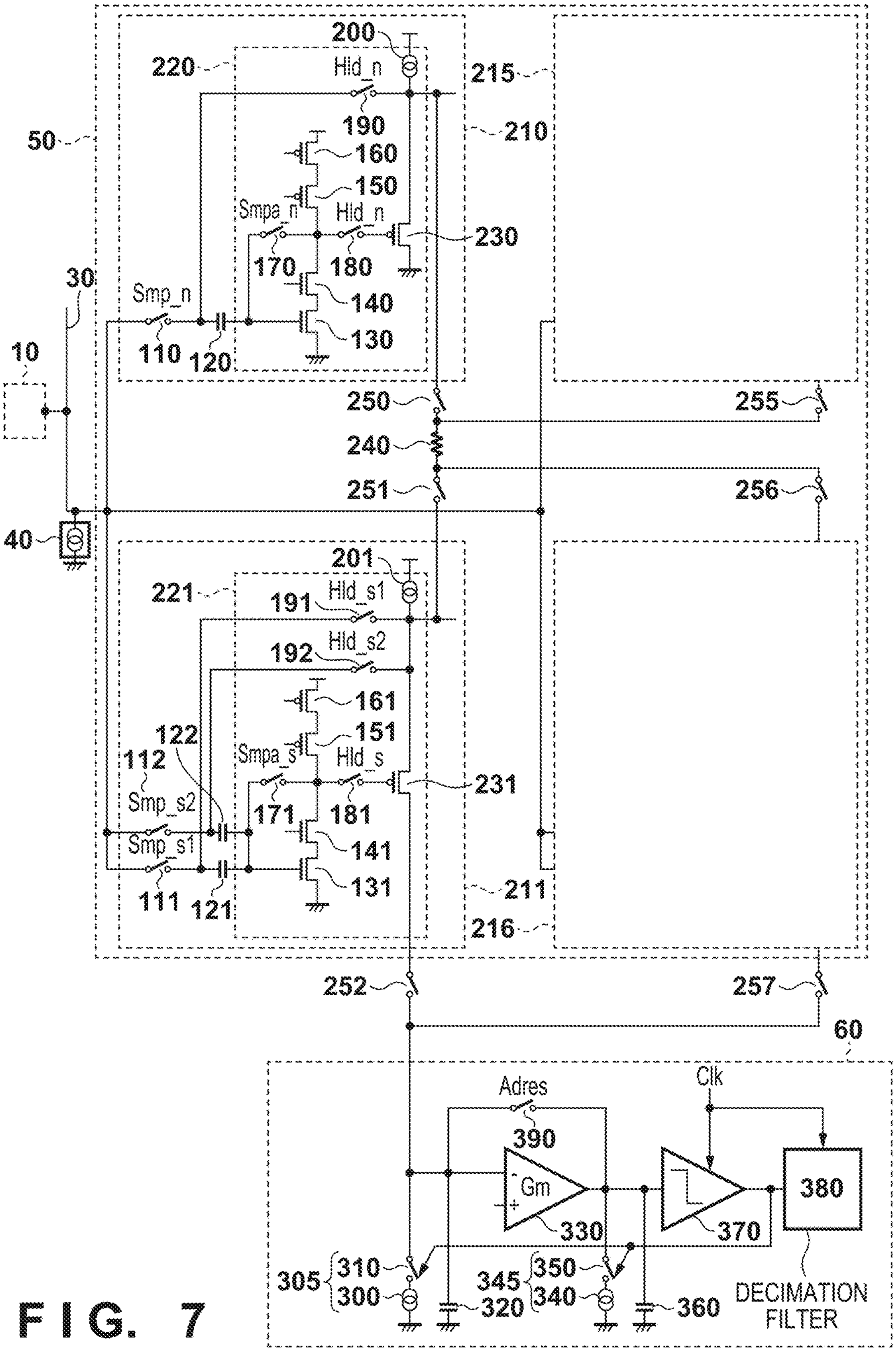
FIG. 7 is a schematic view of a photoelectric conversion apparatus according to the third embodiment.
Figure 8:
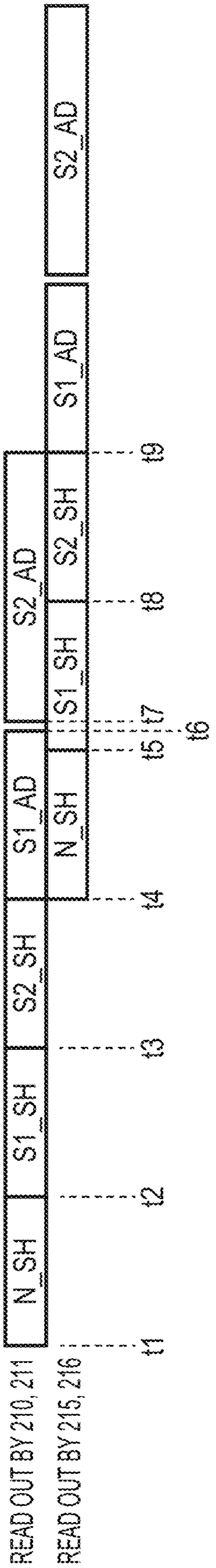
FIG. 8 is a timing chart of the photoelectric conversion apparatus according to the third embodiment.

FIG. 7 shows a schematic view of a photoelectric conversion apparatus according to this embodiment, and FIG. 8 shows a timing chart thereof. Only points different from the first embodiment will be described below. In FIG. 7, the photoelectric conversion apparatus includes a third sampling and holding circuit 215 having the same arrangement as a first sampling and holding circuit 210. Further, the photoelectric conversion apparatus includes a fourth sampling and holding circuit 216 having the same arrangement as a second sampling and holding circuit 211. It is configured such that not only signals from the first sampling and holding circuit 210 and the second sampling and holding circuit 211 but also signals from the third sampling and holding circuit 215 and the fourth sampling and holding circuit 216 are read out from vertical signal lines 30.

A pair of the first sampling and holding circuit 210 and the second sampling and holding circuit 211 is referred to as the first sampling and holding unit, and a pair of the third sampling and holding circuit 215 and the fourth sampling and holding circuit 216 are referred to as the second sampling and holding unit. It is assumed that the first sampling and holding unit is arranged in correspondence with a pixel in a predetermined row, and the second sampling and holding unit is arranged in correspondence with a pixel in another row. The first sampling and holding unit and the second sampling and holding unit can perform an analog-to-digital conversion operation and a sampling and holding operation in overlapping periods. With this, the readout operation period can be further shortened. This will be described later.

In FIG. 7, in order to control readout of signals from the first sampling and holding unit and the second sampling and holding unit, switches 250, 251, 252, 255, 256, and 257 are further provided. With this, when the switches 250, 251, and 252 are turned on, a converter 60 can perform analog-to-digital conversion based on signals held by the first sampling and holding circuit 210 and the second sampling and holding circuit 211. On the other hand, when the switches 250, 251, and 252 are turned off and the switches 255, 256, and 257 are turned on, the converter 60 can perform analog-to-digital conversion based on signals held by the third sampling and holding circuit 215 and the fourth sampling and holding circuit 216.

A more detailed description will be given using the timing chart of FIG. 8. In FIG. 8, in the period from time t1 to time t2, a potential Vn of the signal at the reset level is sampled to the first sampling and holding circuit 210 (the same operation as in the period from time t1 to time t5 in FIG. 4). Then, in the period from time t2 to time t3, a potential Vs1 of the first data signal is sampled to the second sampling and holding circuit 211 (the same operation as in the period from time t5 to time t9 in FIG. 4). Then, in the period from time t3 to time t4, a potential Vs2 of the second data signal is sampled to the second sampling and holding circuit 211 (the same operation as in the period from time t9 to time t13 in FIG. 4). In the period from time t4 to time t6, an analog-to-digital conversion operation is performed in accordance with the potential Vn of the signal at the reset level output from the first sampling and holding circuit 210 and the potential Vs1 of the first data signal output from the second sampling and holding circuit 211 (the same operation as in the period from time t13 to time t14 in FIG. 4).

Note that at this time, the switches 250, 251, and 252 are set in the ON state and the switches 255, 256, and 257 are set in the OFF state. Furthermore, in this embodiment, at time t4, sampling of a potential Vn' of the signal at the reset level of the pixel in the next row to the third sampling and holding circuit 215 is started. In this manner, the first sampling and holding circuit 210 and the second sampling and holding circuit 211 are connected to the converter 60 and analog-to-digital conversion is performed. In the period overlapping the analog-to-digital conversion, readout of signals of the next pixel to the third sampling and holding circuit 215 and the fourth sampling and holding circuit 216 is started. In the above manner, the first sampling and holding unit and the second sampling and holding unit can perform the analog-to-digital conversion operation and the sampling and holding operation in the overlapping periods. With this, further speed reduction of the readout operation can be suppressed.

Fourth Embodiment

Figure 9:
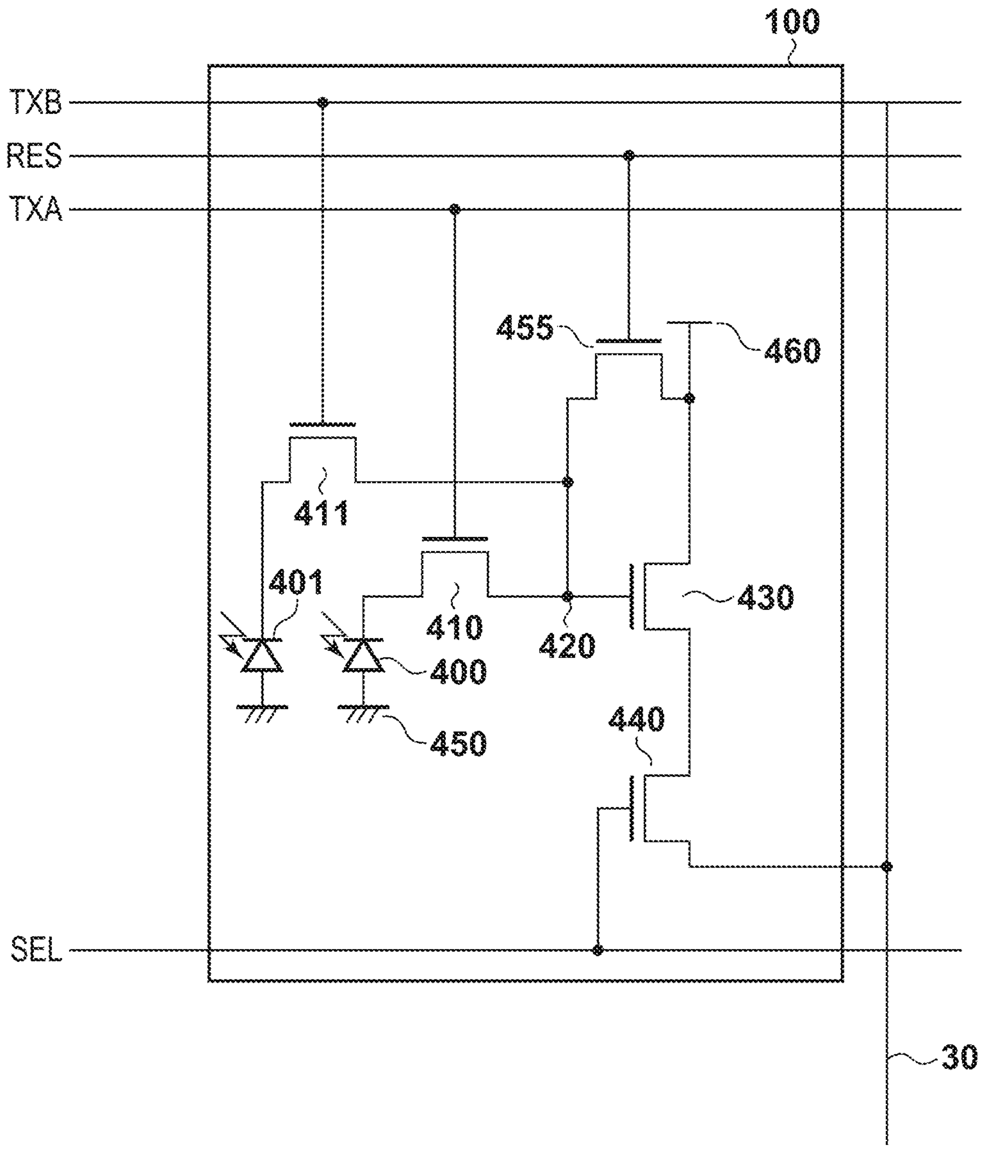
FIG. 9 is a schematic view of a photoelectric conversion apparatus according to the fourth embodiment.

A photoelectric conversion apparatus according to this embodiment will be described with reference to the schematic view of FIG. 9 and the timing chart of FIG. 10. Only points different from the first embodiment will be described below. In this embodiment, a pixel 10 further includes a photoelectric conversion element 401 and a transfer transistor 411. The pixel 10 is formed such that two photoelectric conversion elements 400 and 401 share a floating diffusion 420. The pixel 10 can be, for example, a pixel corresponding to two pixels in the vertical direction. That is, the photoelectric conversion element 400 and the photoelectric conversion element 401 can be arranged so as to correspond to two rows of pixels arranged in a matrix. Also in this case, signals of the photoelectric conversion elements 400 and 401 are held by and output to capacitors 121 and 122 shown in FIG. 3, respectively. Thus, pixel signals for two rows can be read out in a readout period, and the time required for readout can be further shortened.

Figure 10:
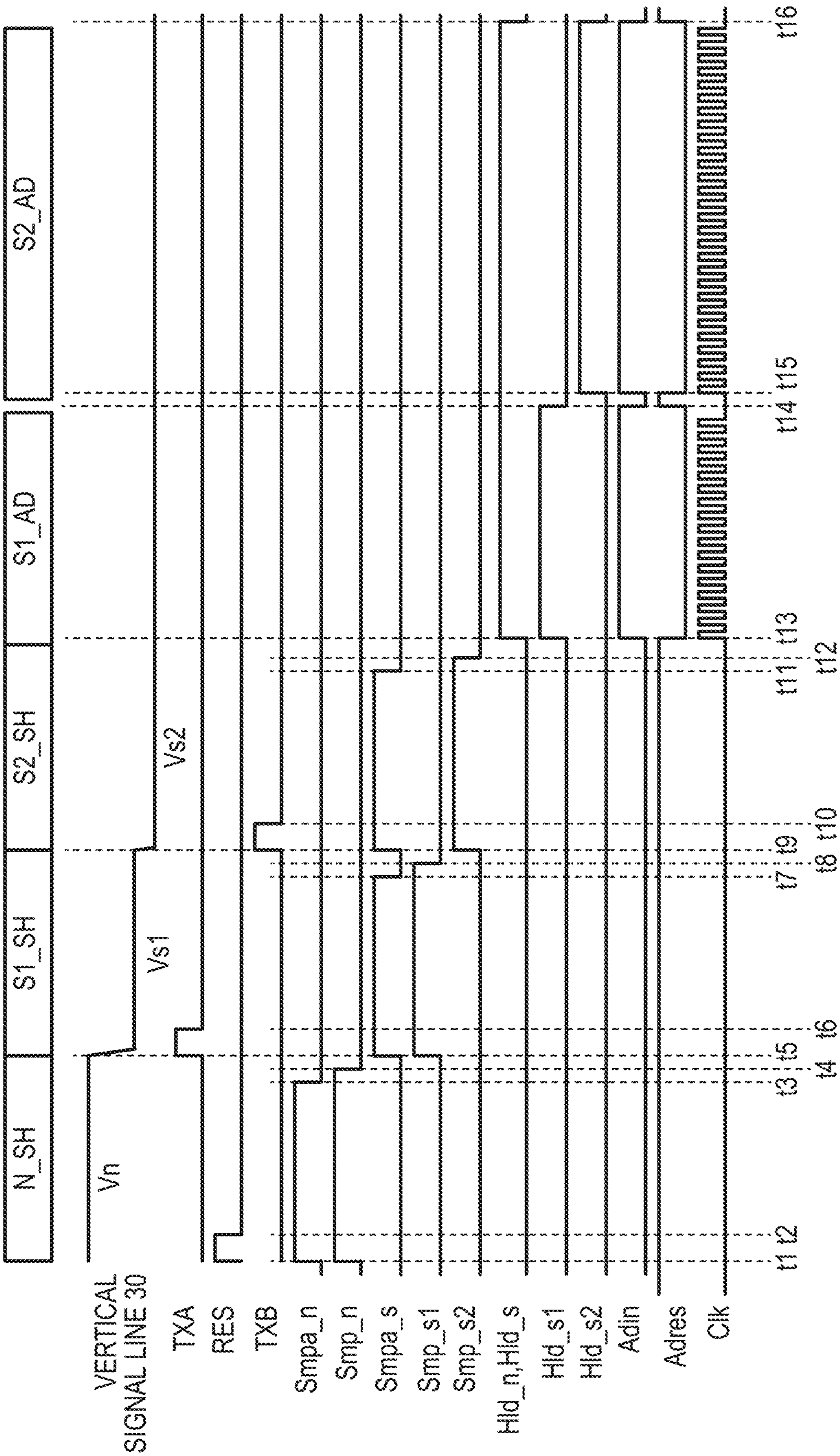
FIG. 10 is a timing chart of the photoelectric conversion apparatus according to the fourth embodiment.

In the timing chart of FIG. 10, in the period from time t5 to time t6, a control signal TXA is set at high level and a transfer transistor 410 is turned on, so that photo charges are transferred from the photoelectric conversion element 400 to the floating diffusion 420. In the period from time t5 to time t8, a control signal Smp_s1 is set at high level, a switch 111 is turned on, and the first data signal based on the photo charges of the photoelectric conversion element 400 are held by the capacitor 121 shown in FIG. 3. In the period from time t9 to time t10, a control signal TXB is set at high level and the transfer transistor 411 is turned on, so that photo charges are transferred from the photoelectric conversion element 401 to the floating diffusion 420. In the period from time t9 to time t12, a control signal Smp_s2 is set at high level, a switch 112 is turned on, and the second data signal based on the photo charges of the photoelectric conversion elements 400 and 401 are held by the capacitor 122 shown in FIG. 3. The capacitor 121 samples and holds the charges corresponding to the period from time t2 to time t6, and the capacitor 122 samples and holds the charges corresponding to the period from time t2 to time t10.

In the period from time t13 to time t14, analog-to-digital conversion of the difference signal between the first data signal and the signal at the reset level is performed, and in the period from time t15 to time t16, analog-to-digital conversion of the difference signal between the second signal and the signal at the reset level is performed. By calculating the difference between the first data signal and the second data signal by a data processor 90 at the succeeding stage, a digital signal for the signal generated by each of the photoelectric conversion elements 400 and 401 can be obtained. A period S1_AD required for analog-to-digital conversion of the first data signal is set shorter than a period S2_AD required for analog-to-digital conversion of the second data signal. With the operation as described above, pixel signals for two rows can be read out in a unit readout period, and the time required for readout can be shortened.

In this embodiment, as in the first embodiment, the period from time t13 to time 14 is set shorter than the period from time t15 to time t16. With this, the time required for readout can be shortened while ensuring the accuracy of analog-to-digital conversion of the signal on the large amplitude side.

The photoelectric conversion elements 400 and 401 may be a pair of photoelectric conversion elements formed under the same microlens arranged in correspondence with the pixel. In this case, by two photoelectric conversion elements 400 and 401, a phase difference signal corresponding to the image phase difference caused by incident light to the photoelectric conversion elements 400 and 401 can be generated. In this case, the first data signal may be used as an autofocus (AF) signal, and the second data signal may be used as an image signal. In this case, the period required for analog-to-digital conversion of the autofocus (AF) signal can be set shorter than the period require for analog-to-digital conversion of the image signal. Although the analog-to-digital conversion accuracy of the autofocus signal becomes lower than the analog-to-digital conversion accuracy of the image signal, the analog-to-digital conversion accuracy of the image signal can be ensured. In addition, the time required for readout can be shortened.

Assume that the first data signal is a signal corresponding to one photoelectric conversion element, and the second data signal is a signal corresponding to two photoelectric conversion elements. The range of the signal amplitude of the first data signal is smaller than the range of the signal amplitude of the second data signal corresponding to two photoelectric conversion elements. This is because two photoelectric conversion elements can hold a larger amount of photo charges than one photoelectric conversion element. The photoelectric conversion elements 400 and 401 may be photodiodes having different areas. Since a large photodiode and a small photodiode can hold different amounts of photo charges, they output signals having different ranges of the signal amplitudes, as in the example of the phase difference detection pixel described above.

Note that, also in this embodiment, as shown in FIG. 5, the pixel 10 can include a transistor 456 for switching the capacitance of the floating diffusion. In this case, if ON/OFF of the transistor 456 is switched during a readout period to read out signals having different voltage conversion gains, the ranges of the signal amplitudes can be different from each other. This is caused by, for example, a difference between the thresholds of a reset transistor 455 and the transistor 456. If the threshold of the reset transistor 455 is relatively high, when the transistor 456 is in the ON state, the voltage conversion gain becomes low and the range of the signal amplitude can be increased. This is because the potential of the floating diffusion 420 can be decreased from the reset level to a lower level.

Modification of Embodiment

Figure 11:
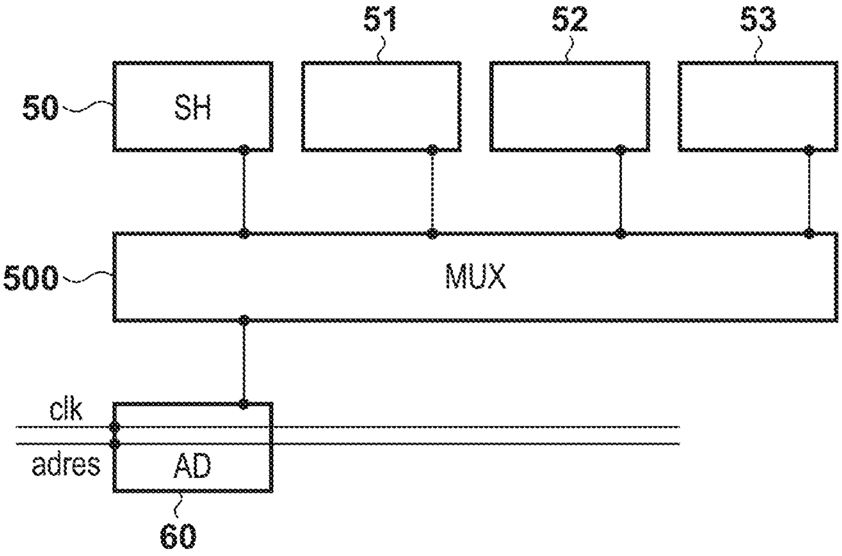
FIG. 11 is a schematic view of a photoelectric conversion apparatus according to a modification of the embodiment.
Figure 12:
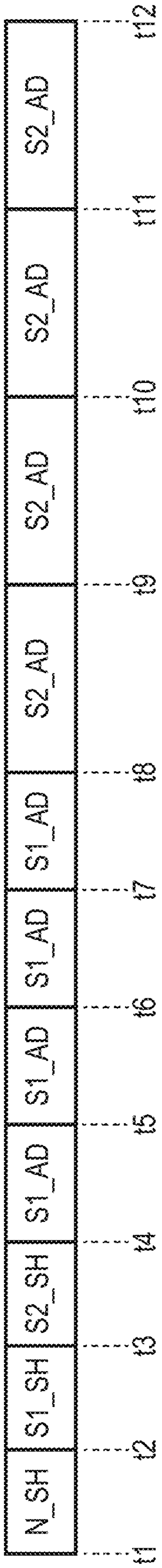
FIG. 12 is a timing chart of the photoelectric conversion apparatus according to the modification of the embodiment.

Note that, in the first embodiment, a description has been given while taking, as an example, the case where one converter 60 is connected to one sampling and holding unit 50, but the present invention is not limited to this. For example, as shown in FIG. 11, four sampling and holding units 50 to 53 may be connected to one converter 60 via a multiplexer 500. An operation will be described here in which a pixel corresponding to each sampling and holding unit is arranged, and the signal at the reset level, the first data signal, and the second data signal from each pixel are sampled and held. FIG. 12 shows an example of the timing chart in this case. The multiplexer 500 operates as a selection circuit for selecting the sampling and holding circuit.

In the period from time t1 to time t2, each of the sampling and holding units 50 to 53 samples the signal at the reset level. In the period from time t2 to time t3, each of the sampling and holding units 50 to 53 samples the first data signal. In the period from time t3 to time t4, each of the sampling and holding units 50 to 53 samples the second data signal. In the period from time t4 to time t8, the multiplexer 500 sequentially connects the sampling and holding units 50 to 53 to the converter 60, thereby serially performing analog-to-digital conversion of the first data signals from the sampling and holding units 50 to 53, respectively.

In the period from time t8 to time t12, the multiplexer 500 sequentially connects the sampling and holding units 50 to 53 to the converter 60, thereby serially performing analog-to-digital conversion of the second data signals from the sampling and holding units 50 to 53, respectively. In this case, the effect of shortening the analog-to-digital conversion period of the first data signal increases fourfold. Accordingly, the time required for readout can be further shortened. In addition, by setting the sampling and holding period and the analog-to-digital conversion period so as to overlap each other as in the third embodiment, the period required for readout and conversion can be further shortened.

<Application of Photoelectric Conversion Apparatus to Apparatus>

Figure 13:
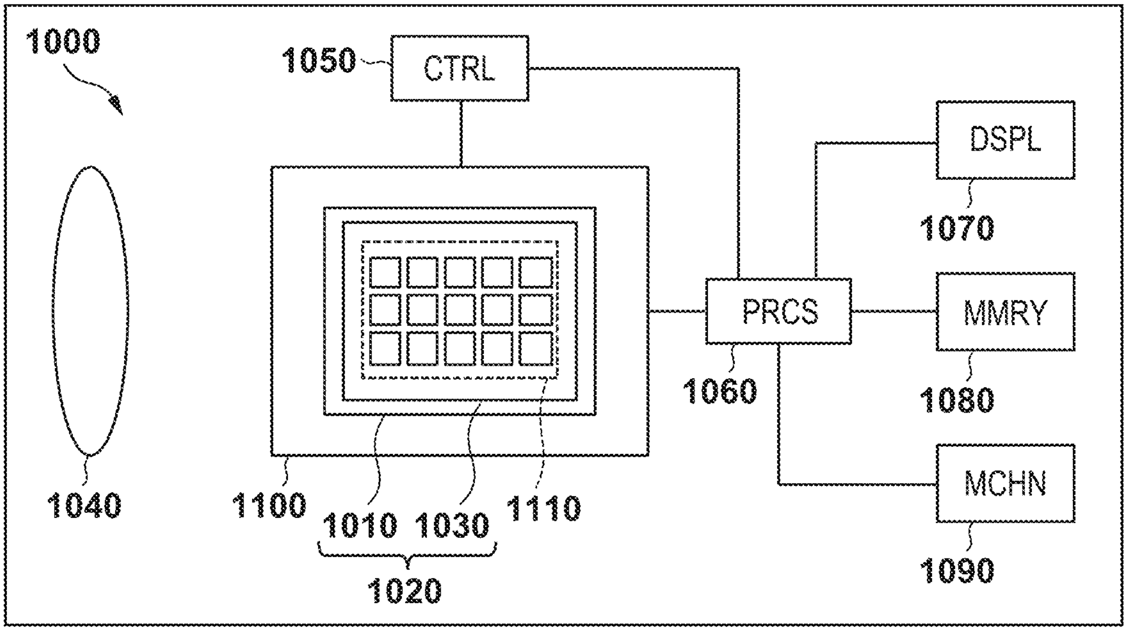
FIG. 13 is a view showing an application example of the photoelectric conversion apparatus according to the embodiment.

The following is a description of an apparatus 1000 that includes a semiconductor apparatus 1100 including a package 1020 on which a semiconductor chip 1110 including a semiconductor integrated circuit is mounted, as shown in FIG. 13. The semiconductor chip 1110 is accommodated in the package 1020 and mounted on the apparatus 1000. In the arrangement shown in FIG. 13, the semiconductor chip 1110 includes the photoelectric conversion apparatus according to the embodiment described above. The semiconductor apparatus 1100 can include the package 1020 including a base 1010 on which the semiconductor chip 1110 is fixed and a light transmissive member 1030 such as glass that faces the semiconductor chip 1110. The package 1020 can be provided with joining members such as wires and bumps that connect inner leads provided on the base 1010 to terminals such as pad electrodes provided on the semiconductor chip 1110.

The apparatus 1000 can include at least one of an optical apparatus 1040, a control apparatus 1050, a processing apparatus 1060, a display apparatus 1070, a storage apparatus 1080, and a mechanical apparatus 1090. The optical apparatus 1040 is implemented by, for example, a lens, a shutter, and a mirror. The control apparatus 1050 controls the semiconductor chip 1110. The control apparatus 1050 is, for example, a semiconductor device such as an ASIC.

The processing apparatus 1060 processes a signal output from the photoelectric conversion apparatus included in the semiconductor chip 1110. The processing apparatus 1060 is a semiconductor device such as a CPU or an ASIC for forming an Analog Front End (AFE) or a Digital Front End (DFE). For example, an image may be generated based on event signals E. The display apparatus 1070 is an Electroluminescent (EL) display device or a liquid crystal display device that displays an information image obtained by the semiconductor chip 1110. The storage apparatus 1080 is a magnetic device or a semiconductor device that stores the information image obtained by the semiconductor chip 1110. The storage apparatus 1080 is a volatile memory such as an SRAM or a DRAM, or a nonvolatile memory such as a flash memory or a hard disk drive.

The mechanical apparatus 1090 includes a moving or propulsion unit such as a motor or an engine. In the apparatus 1000, the signal output from the semiconductor chip 1110 is displayed on the display apparatus 1070 or transmitted to an external apparatus by a communication apparatus (not shown) included in the apparatus 1000. Hence, the apparatus 1000 may further include the storage apparatus 1080 and the processing apparatus 1060 in addition to the memory circuits and arithmetic circuits included in the semiconductor chip 1110. The mechanical apparatus 1090 may be controlled based on the signal output from the semiconductor chip 1110.

In addition, the apparatus 1000 is suitable for an electronic apparatus such as an information terminal (for example, a smartphone or a wearable terminal) which has a shooting function or a camera (for example, an interchangeable lens camera, a compact camera, a video camera, or a surveillance camera). The mechanical apparatus 1090 in the camera can drive the components of the optical apparatus 1040 in order to perform zooming, an in-focus operation, and a shutter operation. Alternatively, the mechanical apparatus 1090 in the camera can move the optical apparatus 1040 in order to perform an anti-vibration operation.

Furthermore, the apparatus 1000 can be a transportation apparatus such as a vehicle, a ship, or an airplane. The mechanical apparatus 1090 in the transportation apparatus can be used as a moving apparatus. The apparatus 1000 as the transportation apparatus is suitable for an apparatus that transports the semiconductor chip 1110 or an apparatus that uses a shooting function to assist and/or automate drive steering. The processing apparatus 1060 for assisting and/or automating drive steering can perform, based on the information obtained by the semiconductor chip 1110, processing for operating the mechanical apparatus 1090 as a moving apparatus. Alternatively, the apparatus 1000 may be a medical apparatus such as an endoscope, a measurement apparatus such as a distance measurement sensor, an analysis apparatus such as an electron microscope, an office apparatus such as a copy machine, or an industrial apparatus such as a robot.

Note that the forms of the imaging device and the photoelectric conversion apparatus are not limited to those described above. For example, the pixel 10 is not limited to the form shown in FIG. 2. A plurality of vertical signal lines may be provided in one pixel column, or a plurality of selection transistors 440 may be provided. Further, the converter 60 may be formed to use a comparator including a capacitor and a switch for an auto zero operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-093307 filed Jun. 6, 2023, which is hereby incorporated by reference herein in its entirety.

What is claimed is:

1. A photoelectric conversion apparatus comprising:

a pixel including a photoelectric conversion element, and configured to output two signals having different amplitudes based on incident light to the photoelectric conversion element;

a sampling and holding circuit configured to sample and hold each of the two signals output from the pixel; and an oversampling analog-to-digital conversion circuit configured to sequentially perform analog-to-digital conversion of each of the sampled and held signals, wherein a period for performing analog-to-digital conversion of a signal having a smaller amplitude among the two signals is set shorter than a period for performing analog-to-digital conversion of a signal having a larger amplitude among the two signals.

2. The apparatus according to claim 1, further comprising a circuit, between the sampling and holding circuit and the conversion circuit, configured to adjust magnitudes of the two signals output from the sampling and holding circuit.

3. The apparatus according to claim 2, wherein the circuit that adjusts the magnitudes adjusts the magnitude of each of the two signals.

4. The apparatus according to claim 1, wherein the sampling and holding circuit comprises an amplification circuit, and the two signals are output via the amplification circuit.

5. The apparatus according to claim 1, wherein
the conversion circuit performs analog-to-digital conversion of a difference between each of the two signals and a signal at a reset level of the photoelectric conversion element.

6. The apparatus according to claim 1, wherein
the pixel includes two photoelectric conversion elements, and the two signals include a signal obtained from one photoelectric conversion element of the two photoelectric conversion elements and a signal obtained from the two photoelectric conversion elements.

7. The apparatus according to claim 6, wherein
the two photoelectric conversion elements are arranged in different rows of the pixels arranged in a matrix.

8. The apparatus according to claim 6, wherein
a microlens is arranged in correspondence with the pixel, and a phase difference signal is generated based on the two signals.

9. The apparatus according to claim 6, wherein
the two photoelectric conversion elements are configured to generate different amounts of charges in accordance with incident light in the same period.

10. The apparatus according to claim 1, wherein
the analog-to-digital conversion is performed in a period while a clock signal is supplied to the conversion circuit, and
the number of cycles of the clock signal supplied in a period for performing analog-to-digital conversion of the signal having the smaller amplitude is set to be smaller than the number of cycles of a clock signal supplied in a period for performing analog-to-digital conversion of the signal having the larger amplitude.

11. The apparatus according to claim 10, wherein
a frequency of the clock signal supplied in a period for performing analog-to-digital conversion of the signal having the smaller amplitude is set to be higher than a frequency of the clock signal supplied in a period for performing analog-to-digital conversion of the signal having the larger amplitude.

12. The apparatus according to claim 1, wherein
the two signals are held by two capacitors of the sampling and holding circuit, respectively.

13. The apparatus according to claim 1, wherein
an integrator is provided at an input of the analog-to-digital conversion circuit.

14. The apparatus according to claim 13, wherein
the integrator is reset during a period while no analog-to-digital conversion is performed.

15. The apparatus according to claim 1, comprising a plurality of the sampling and holding circuits, a selection circuit configured to select the plurality of the sampling and holding circuits, and the analog-to-digital conversion circuit configured to perform analog-to-digital conversion of a signal from a selected sampling and holding circuit.

16. The apparatus according to claim 15, wherein
a period for performing analog-to-digital conversion of a signal from a first sampling and holding unit among the plurality of the sampling and holding units is set to overlap a period when a second sampling and holding unit, among the plurality of the sampling and holding units, samples and holds a signal from the pixel.

17. An apparatus comprising:
a photoelectric conversion apparatus defined in claim 1; and
a processing apparatus configured to process a signal output from the photoelectric conversion apparatus.

18. A substrate that is stacked on a substrate arranged with a pixel including a photoelectric conversion element and configured to output two signals having different amplitudes based on incident light to the photoelectric conversion element, the substrate comprising:
a sampling and holding circuit configured to sample and hold each of the two signals output from the pixel; and
an oversampling analog-to-digital conversion circuit configured to sequentially perform analog-to-digital conversion of each of the sampled and held signals,
wherein a period for performing analog-to-digital conversion of a signal having a smaller amplitude among the two signals is set shorter than a period for performing analog-to-digital conversion of a signal having a larger amplitude.

* * * * *